United States Patent [19]
Weaver et al.

[11] Patent Number: 5,212,209
[45] Date of Patent: May 18, 1993

[54] COMPATIBILIZED INTERNAL MOLD RELEASE COMPOSITION FOR PREPARATIONS OF FOAMED AND FIBER-REINFORCED POLYMERIC ARTICLES

[75] Inventors: Laura B. Weaver; Robert Carswell, both of Lake Jackson, Tex.

[73] Assignee: The Dow Chemical Company, Midland, Mich.

[21] Appl. No.: 793,779

[22] Filed: Nov. 18, 1991

[51] Int. Cl.⁵ .............................................. C08G 18/14
[52] U.S. Cl. ..................................... 521/122; 521/123; 521/124; 521/125; 521/126; 521/127; 252/182.24; 252/182.25; 428/425.6
[58] Field of Search ............... 521/122, 123, 124, 125, 521/126, 127; 252/182.24, 182.25; 428/425.6

[56] References Cited

U.S. PATENT DOCUMENTS

| | | | |
|---|---|---|---|
| Re. 28,715 | 2/1976 | Stamberger | 260/33.2 |
| Re. 29,014 | 10/1976 | Pizzini et al. | 260/33.2 |
| Re. 29,118 | 1/1977 | Stamberger | 521/159 |
| 3,201,367 | 8/1965 | Smith | 260/45.9 |
| 3,413,390 | 11/1968 | Heiss | 264/54 |
| 3,607,397 | 9/1971 | Watters | 134/3 |
| 3,624,190 | 11/1971 | Cekeda | 264/41 |
| 3,640,769 | 2/1972 | Watters | 134/42 |
| 3,654,370 | 4/1972 | Yeskey | 260/584 |
| 3,694,530 | 9/1972 | Wolfe | 264/48 |
| 3,726,952 | 4/1971 | Boden et al. | 264/48 |
| 3,728,308 | 4/1973 | Allison et al. | 528/76 |
| 3,753,933 | 8/1973 | Olstowski et al. | 528/76 |
| 3,869,413 | 3/1975 | Blankenship | 521/155 |
| 3,980,579 | 9/1976 | Syrop et al. | 252/182.24 |
| 4,024,088 | 5/1977 | Godlewski | 252/182.24 |
| 4,076,695 | 2/1978 | Keil | 528/76 |
| 4,098,731 | 7/1978 | von Bonin et al. | 521/51 |
| 4,111,861 | 9/1978 | Godlewski | 521/123 |
| 4,111,914 | 9/1978 | Kresta et al. | 528/48 |
| 4,125,487 | 11/1978 | Olstowski | 521/137 |
| 4,126,741 | 11/1978 | Carleton et al. | 528/57 |
| 4,130,698 | 12/1978 | Sparrow et al. | 521/51 |
| 4,201,847 | 5/1980 | Kleimann et al. | 521/172 |
| 4,220,727 | 9/1980 | Godlewski | 521/110 |
| 4,239,857 | 12/1980 | Harper | 521/121 |
| 4,269,945 | 5/1981 | Vanderhider et al. | 521/159 |
| 4,296,212 | 10/1981 | Ewen et al. | 521/163 |

(List continued on next page.)

FOREIGN PATENT DOCUMENTS

| | | |
|---|---|---|
| 596457 | 11/1987 | Australia . |
| 002724 | 7/1979 | European Pat. Off. . |
| 081701 | 6/1985 | European Pat. Off. . |
| 303105 | 2/1988 | European Pat. Off. . |
| 260685 | 3/1988 | European Pat. Off. . |
| 268906 | 6/1988 | European Pat. Off. . |
| 2101140 | 1/1983 | United Kingdom . |

OTHER PUBLICATIONS

R. C. Mehrotra and V. D. Gupta in *J. Organometallic Chem.* 1965, 4, pp. 145–150.

Wm. J. Considine in *J. Organometallic Chem.* 1965, 5, pp. 263–266.

(List continued on next page.)

*Primary Examiner*—Maurice J. Welsh

[57] ABSTRACT

Compositions and a method for preparing a molded foamed polymeric article comprising (1) a relatively high molecular weight polyahl and a relatively low molecular weight polyol, in proportions such that the relatively high molecular weight polyahl and the relatively low molecular weight polyol are incompatible, (2) a polyisocyanate, (3) a blowing agent, and (4) an internal mold release/compatibilizing agent containing (a) a metal salt of a weak acid, wherein the metal is selected from elements of the Periodic Table of the Elements having Atomic Numbers 3–5, 11–14, 19–34, 37–52, 55–57, and 72–84, and (b) a compound containing at least one amine group, wherein the internal mold release/compatibilizing agent is present in an amount sufficient to provide mold release characteristics to the article and to compatibilize the relatively high molecular weight polyahl and the relatively low molecular weight polyol, are disclosed. In a preferred embodiment the blowing agent is water. The compatibilized compositions exhibit mold release characteristics and also improved adhesion to vinyl-based polymers.

30 Claims, No Drawings

U.S. PATENT DOCUMENTS

| | | | |
|---|---|---|---|
| 4,362,824 | 12/1982 | Dominguez et al. | 521/118 |
| 4,390,645 | 6/1983 | Hoffman et al. | 521/137 |
| 4,394,491 | 7/1983 | Hoffman | 525/404 |
| 4,427,798 | 1/1984 | Konig et al. | 521/173 |
| 4,433,067 | 2/1984 | Rice et al. | 521/51 |
| 4,435,349 | 3/1984 | Dominguez et al. | 264/257 |
| 4,444,910 | 4/1984 | Rice et al. | 521/51 |
| 4,485,031 | 11/1984 | Olstowski et al. | 568/624 |
| 4,485,032 | 11/1984 | Olstowski et al. | 568/624 |
| 4,547,478 | 10/1985 | Chang | 502/154 |
| 4,548,919 | 10/1985 | Megna | 502/154 |
| 4,575,518 | 3/1986 | Rasshofer et al. | 521/51 |
| 4,585,803 | 4/1986 | Nelson et al. | 521/105 |
| 4,595,743 | 6/1986 | Laughner et al. | 528/73 |
| 4,673,696 | 6/1987 | Tsai | 521/172 |
| 4,719,247 | 1/1988 | Lin et al. | 521/159 |
| 4,742,091 | 5/1988 | Grigsby, Jr. et al. | 521/163 |
| 4,745,137 | 5/1988 | Thomas et al. | 521/137 |
| 4,751,251 | 6/1988 | Thornsberry | 521/112 |
| 4,751,253 | 6/1988 | Tylenda | 521/114 |
| 4,753,966 | 6/1988 | Haas et al. | 521/51 |
| 4,755,321 | 7/1988 | Moss et al. | 252/182.24 |
| 4,766,172 | 8/1988 | Weber et al. | 524/783 |
| 4,774,263 | 9/1988 | Weber et al. | 521/51 |
| 4,774,264 | 9/1988 | Weber et al. | 521/51 |
| 4,876,019 | 10/1989 | Meyer et al. | 252/325 |
| 4,895,879 | 1/1990 | Nelson et al. | 521/105 |
| 4,981,877 | 1/1991 | Carswell | 521/51 |
| 5,008,033 | 4/1991 | Meyer et al. | 252/182.13 |
| 5,011,647 | 4/1991 | Meyer et al. | 264/300 |
| 5,057,543 | 10/1991 | Carswell | 521/51 |
| 5,070,110 | 12/1991 | Carswell et al. | 521/51 |

OTHER PUBLICATIONS

A. Pauperio and R. N. Santos in *Exploring New Horizons*, 1986, pp. 240–243.

COMPATIBILIZED INTERNAL MOLD RELEASE COMPOSITION FOR PREPARATIONS OF FOAMED AND FIBER-REINFORCED POLYMERIC ARTICLES

BACKGROUND OF THE INVENTION

The present invention relates to a process for preparing molded polymeric articles. More particularly, the present invention relates to a process for preparing molded polymeric articles exhibiting mold release characteristics from compatibilized formulations.

Polymeric moldings are being increasing used in the manufacture of automobiles, furniture, building construction materials and the like, in particular, molded polyurethanes and/or polyureas are of increasing importance because they are lightweight and resistant to moisture, temperature extremes, and deterioration due to aging. Molded elastomers have become of special interest in the manufacture of force-reducing impact media such as impact resistant automotive fascia. For some purposes, including, for example, automobile interior door panels and other automotive parts requiring particularly low density and also high strength, it has been found desirable to incorporate a blowing agent to reduce density and/or a fibrous reinforcing material, such as particulate fillers or a fibrous mat, to increase strength and dimensional stability.

The high demand for molded polyurethane and/or polyurea articles requires that these parts be produced in the largest numbers in the shortest possible time. Polyurethane-forming mixtures are generally well-suited for mass production because the reactants are liquid, and therefore pumpable, and react very quickly. A problem has existed, however, in providing adequate mold release in the shortest possible time to take full advantage of the unique capabilities of the polyurethane and/or polyurea systems.

Heretofore, release of molded articles from molds in which they have been formed has been achieved by coating the surface of the mold cavity with an agent which facilitates release of the molded article from the walls of the mold cavity. Procedures such as this are described in U.S. Pat. Nos. 3.694,530: 3,640769: 3,624,190: 3,607,397: and 3,413,390. This method has certain important disadvantages. One problem is that the externally applied release agent may, after molding, adhere to the surface of the molded article. Thus, the external mold release agent is removed with the molded part and must be reapplied after each molding, i.e., "shot". The need to repeatedly reapply the mold release agent greatly increases the time required to make each molded article, and this in turn causes a significant increase in the cost of preparing the molded part.

A second problem encountered is that the mold release agent may act to affect the surface properties of the molded part. Therefore it must, in many cases, be removed to enable further processing, such as painting or adhesion. Again, the cycle time is expensively extended.

A third problem encountered is that build-up of polymer or external mold release agent in the mold from the article being molded may occur. In this instance a film of polymer or external mold release agent may be left in spot areas of the mold's inner surface. This build-up on the surface of the mold cavity walls may eventually cover and obscure detail on the mold cavity surface desired to be imparted to the molded article.

In order to avoid the problems encountered with external mold release agents various researchers have developed "internal mold release agents". These agents are incorporated into the polymer material prior to molding, and as such avoid the need for repeated application of an external agent. Among these are, for example, primary, secondary and tertiary amine salts of carboxylic acids and those disclosed in, e.g., U.S. Pat. Nos. 3,726,952: 4,024,088: 4,098,731: 4,130,698: 4,111,861: 4,201,847: 4,220,727: and 4,585,803.

However, some of these internal mold release agents also result in processing difficulties that are at least as detrimental to total time and quality considerations than those problems caused by the use of external release agents. One problem is that some of these internal mold release agents are incompatible with polyether polyols, and thus experience limited application, and/or may seriously reduce the activity of a required reaction catalyst. Then additional means must be provided to restore the catalyst's activity. See e.g., U.S. Pat. No. 4,111,861, wherein it is noted that certain polar metal compounds, including the bismuth, lead, sodium, lithium and potassium ions, used with sodium carbonate, sodium oleate and potassium laurate are helpful. Sodium oleate alone has also been demonstrated to be an effective release agent. Finally, most of these internal mold release agents are shown to be detrimental to desirable physical properties of the final product, such as elongation.

Zinc stearate and a number of other metal carboxylates have been known to be effective release agents for thermoplastics. However, as a single additive it cannot be readily dispersed in certain polyurethane systems and therefore fails to exhibit adequate release characteristics. It was recently shown in U.S. Pat. Nos. 4,876,019 and 4,585,803 that it can be compatibilized by the presence of an amine and function as an excellent internal mold release agent in various polyurethane systems.

However, the above-noted internal mold release agents have not been used in foamed polyurethane and/or polyurea systems comprising ethylene glycol or other relatively low molecular weight polyols, in combination with relatively high molecular weight polyahls with which the polyols are normally incompatible or incompatible in the proportions employed. In these systems the incompatibility of the constituents results in a cloudy or otherwise phase-separated system that may present problems in storage stability or processing. This problem is further exacerbated when water is included in the system as a blowing agent, since the water and the relatively high molecular weight polyol are also incompatible in certain proportions. However, water is becoming an increasingly preferred blowing agent for flexible and semi-flexible foams, as many other blowing agents are discouraged due to environmental concerns. Researchers and manufacturers alike have been heretofore resigned to the need for external mold release agents in preparing these water-blown foams.

External mold release agents commonly used for these systems include, for example, solubilized hydrocarbon waxes, silicone oils, soaps in solution and the like. The external release agents generally adhere to the molded article, and thus provide only one release before reapplication is required. As already noted, this is both costly and time-consuming. In adhering to the molded article the external mold release agents may also result in surface quality and industrial hygiene problems related to the presence of environmentally-suspect solvents.

Formulations containing water as a blowing agent are also used for fiber-reinforced composites, particularly for a method of preparing fiber mat-reinforced composites known as low density reinforced reaction injection molding (RIM). Reinforced RIM molding is achieved in two ways. In one a reinforcing mat such as, e.g., a fiberglass mat, approximating the size and, in some instances, shape of the interior of the mold is prepared and then inserted into the mold. Once the mat is in place the reactant mixture, generally containing polymeric isocyanates, polyahl formulation, catalysts, surfactants and water as a blowing agent as well as, in some cases, additional blowing agents, is introduced into the mold. During the molding operation the reactant mixture soaks, surrounds and adheres to the mat material, and at the same time the water and additional blowing agents provide blowing to form a cellular composite having particularly low density. The presence of the fiber reinforcing mat provides excellent dimensional stability and increased strength with minimal increase in weight. Alternatively, reinforcing fillers such as milled glass can be incorporated into the polayahl formulation, which is then dispensed into the mold with the isocyanate, forming a dimensionally stable molded article of low density.

Again, however, those in the industry are presently using external mold release agents to prepare these foamed molded fiber-reinforced composites. As is the case with other foamed polymeric materials, external mold release agents such as solubilized hydrocarbon waxes, silicon oils, soaps in solution and the like are employed, with the usual array of associated problems as discussed above.

In view of the problems encountered with external mold release agents for molded polyurethane and/or polyurea systems which contain ethylene glycol or another relatively low molecular weight polyol and relatively high molecular weight polyahls which are incompatible in the applicable proportions, and also in some cases water, it would therefore be highly desirable to provide foamed compositions containing these starting materials and an internal mold release agent which significantly reduce or eliminate the need to apply external mold release agents and which exhibit compatibilization of the relatively low molecular weight polyol and the relatively high molecular weight polyahl and, optionally, of the water. It would be further desirable that such compositions be applicable to foamed polymeric moldings in general, as well as to fiber-reinforced polymeric moldings.

SUMMARY OF THE INVENTION

The present invention provides compositions for preparing molded foamed polyurethane and/or polyurea articles comprising (1) a relatively high molecular weight polyahl, and a relatively low molecular weight polyol, in proportions such that the relatively high molecular weight polyahl and the relatively low molecular weight polyol are incompatible. (2) a polyisocyanate, (3) a blowing agent, and (4) an internal mold release/compatibilizing agent containing (a) a metal salt of an acid, wherein the metal is selected from elements of the Periodic Table of the Elements having Atomic Numbers 3-5, 11-14, 19-34, 37-52, 55-57, and 72-84, and (b) a compound containing at least one amine group, wherein the internal mold release/compatibilizing agent is present in an amount sufficient to provide mold release characteristics to the article and to compatibilize the relatively high molecular weight polyahl and the relatively low molecular weight polyol. In one preferred embodiment of the present invention the blowing agent is water. These compositions can further comprise a fiber reinforcing mat or filler.

The present invention also provides a process for preparing a molded foamed article by reacting the compositions of the present invention, optionally containing water and/or a fiber reinforcing mat, in a mold.

In another aspect the present invention provides a compatibilized composition for preparing molded foamed polyurethane and/or polyurea articles comprising (1) a relatively high molecular weight polyahl and a relatively low molecular weight polyol, in proportions such that they are incompatible, and (2) a compatibilizing agent containing (a) a metal salt of an acid, the metal being selected from elements of the Periodic Table of the Elements having Atomic Numbers 3-5, 11-14, 19-34, 37-52, 55-57, and 72-84, and (b) a compound containing at least one amine group, wherein the amount of the compatibilizing agent is sufficient to compatibilize the relatively high molecular weight polyahl and the relatively low molecular weight polyol.

The present invention still further provides a process for compatibilizing a relatively low molecular weight polyahl and a relatively high molecular weight polyol in proportions such that they are incompatible comprising admixing therewith a compatibilizing agent containing (a) a metal salt of an acid, the metal being selected from elements of the Periodic Table of the Elements having Atomic Numbers 3-5, 11-14, 19-34, 37-52, 55-57, and 72-84, and (b) a compound containing at least one amine group, in an amount sufficient to compatibilize the relatively low molecular weight polyahl and the relatively high molecular weight polyol.

In still another aspect the present invention pro ides molded foamed polyurethane and or polyurea compositions showing improved adhesion to vinyl-based substrates comprising (1) a vinyl-based substrate, and (2) a molded foamed polyurethane and/or polyurea prepared from a composition of the present invention as described hereinabove. A method of preparing these compositions is also encompassed.

In yet another aspect the present invention provides compositions for preparing molded foamed polyurethane and/or polyurea articles comprising (1) a relatively high molecular weight polyahl and, as a blowing agent, water, in proportions such that the relatively high molecular weight polyahl and the water are incompatible, (2) a polyisocyanate, and (3) an internal mold release/compatibilizing agent containing (a) a metal salt of an acid, wherein the metal is selected from elements of the Periodic Table of the Elements having Atomic Numbers 3-5, 11-14, 19-34, 37-52, 55-57, and 72-84, and (b) a compound containing at least one amine group, wherein the internal mold release/compatibilizing agent is present in an amount sufficient to provide mold release characteristics to the article and to compatibilize the relatively high molecular weight polyahl and the water.

The present invention also provides a process for preparing a molded foamed article by reacting the compositions of the present invention in a mold.

In a further aspect the present invention provides a compatibilized composition for preparing molded foamed polyurethane and/or polyurea articles comprising (1) a relatively high molecular weight polyahl and water, in proportions such that they are incompatible, and (2) a compatibilizing agent containing (a) a metal salt of an acid, the metal being selected from elements of the Periodic Table of the Elements having Atomic Numbers 3-5, 11-14, 19-34, 37-52, 55-57, and 72-84, and (b) a compound containing at least one amine group, wherein the amount of the compatibilizing agent is sufficient to compatibilize the relatively high molecular weight polyahl and the water.

The present invention still further provides a process for compatibilizing a relatively low molecular weight polyahl and water in proportions such that they are incompatible comprising admixing therewith a compatibilizing agent containing (a) a metal salt of an acid, the metal being selected from elements of the Periodic Table of the Elements having Atomic Numbers 3-5, 11-14, 19-34, 37-52, 55-57, and 72-84, and (b) a compound containing at least one amine group, in an amount sufficient to compatibilize the relatively low molecular weight polyahl and the water.

The invention thus provides compositions and methods for preparing molded foamed polymeric articles, particularly foamed flexible or semi-flexible polyurethane and/or polyurea compositions and foamed fiber mat-reinforced composite materials, that contain compatibilized amounts of relatively high molecular weight polyahls and relatively low molecular weight polyols, and/or or relatively high molecular weight polyahls and water, exhibiting mold release characteristics. In particular, the invention provides a composition and means of preparing molded foamed polymeric materials having improved adhesion qualities, particularly regarding adhesion to vinyl substrates. The formulations from which the articles are prepared are compatibilized by the presence of the metal salt and amine-containing compound, and thus do not experience the cloudiness or other evidence of phase separation which is indicative of incompatibility, that would be encountered without the metal salt and amine-containing compound.

As used herein the phrase "mold release characteristics" refers to an improvement in at least one of two indicia of mold release which are provided by this invention. These indicia are (1) the number of consecutive releases of molded articles from a mold between treatments of the mold with an external mold release agent, and (2) the force required to remove an individual molded article from the mold. With the use of the internal mold release agent in the specified polyurethane and/or polyurea formulations of this invention, substantially less force is usually required to remove the molded article from the mold than when the internal mold release agent is not present. In addition, the use of these internal mold release formulations generally permits a plurality of articles to be produced in a single mold between treatments of the mold with an external mold release agent. When no such internal mold release agent is employed, the mold must usually be treated with an external mold release agent before each molding or each few moldings.

DESCRIPTION OF THE PREFERRED EMBODIMENTS

A first component of the internal mold release/compatibilizing agent of the present invention is a metal salt of an organic acid. Exemplary of such acids are carboxylic acids, phosphorus-containing acids, and boron-containing acids. Preferred, on the basis of cost and availability, are salts of carboxylic acids.

Suitable carboxylic acids useful herein include any saturated or unsaturated aliphatic, cycloaliphatic or aromatic carboxylic acid or polycarboxylic acid, particularly those containing from about 2 to about 40. preferably from about 8 to about 30, and more preferably from about 10 to about 18. carbon atoms. Especially suitable carboxylic acids include the $C_8$–$C_{40}$ alkanoic or mono-unsaturated alkanoic carboxylic acids commonly referred to as "fatty acids". Of these, capric acid, lauric acid, myristic acid, palmitic acid, stearic acid, caprylic acid, caproleic acid, palmitoleic acid and oleic acid are of particular interest due to their performance, low cost and ready availability.

Also suitable are carboxylic acids represented by the formula

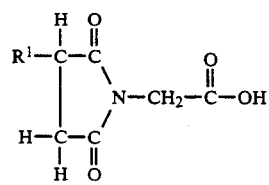

wherein $R_1$ is a hydrocarbyl group having from about 1 to about 12 carbon atoms.

Also suitable are amido-containing carboxylic acids such a those represented by the general formula

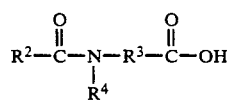

wherein $R^2$ is an inertly substituted hydrocarbyl group having from about 1 to about 29, preferably from about 2 to about 17 carbon atoms: and $R^3$ is a divalent hydrocarbon group having from about 1 to about 3, preferably 1, carbon atoms $R^4$ is hydrogen, alkyl or hydroxyalkyl having from about 1 to about 3 carbon atoms. These amido-containing carboxylic acids preferably have a total of less than about 30 carbon atoms, more preferably from about 15 to about 30, most preferably from about 15 to 21 carbon atoms. Exemplary such amido-containing carboxylic acids include oleoyl sarcosine, lauroyl sarcosine, capryl sarcosine, palmitoyl sarcosine, stearoyl sarcosine, oleoyl glycine, octanoyl glycine, oleoyl hydroxyethyl glycine, mixtures thereof and the like. These amido-carboxylic acids can be prepared by the Schotten-Bauman acylation reaction wherein an acid halide is reacted with an amino acid.

Suitable materials containing at least one carboxylic acid group and containing siloxane chains include those described by J. W. Keil in U.S. Pat. No. 4,076,695, which is incorporated herein in its entirety by reference.

Suitable organic materials containing at least one phosphorus-containing acid group include, for example, monostearyl acid phosphate, cetyl dihydrogen phosphate, monolauryl phosphate, decyl dihydrogen phosphate, monobutyl monodecyl ester of phosphoric acid, mixtures thereof and the like.

Suitable organic materials containing at least one boron-containing acid group include, for example, dioctadecyl ester of boric acid, monododecyl mono(phenylmethyl) ester of boric acid, monododecyl monophenyl ester of boric acid, monoheptadecyl mono(phenylmethyl) ester of boric acid, monodecyl ester of boric acid, mixtures thereof and the like.

The foregoing acids are present in the composition in the form of a salt of a metal selected from elements of the Periodic Table of the Elements having Atomic Numbers 3-5, 11-14, 19-34, 37-52, 55-57, and 72-84. Preferred metals are zinc, lithium, copper, iron, aluminum, cobalt and nickel. Most preferred are zinc, calcium, magnesium and nickel.

The metal salt of the aforementioned acid is suitably prepared by reacting the acid with a basic compound containing the metal, in particular, a hydroxide of the metal. If the metal is above hydrogen in the electromotive series, it can be reacted directly with the acid to form the desired salt.

Particularly useful metal salts of the foregoing acids include, for example, zinc laurate, zinc stearate, zinc oleate, zinc palmitate, zinc myristate, calcium laurate, calcium oleate, calcium palmitate, calcium stearate, calcium myristate, magnesium laurate, magnesium stearate, magnesium oleate, magnesium palmitate, magnesium myristate, nickel laurate, nickel myristate, copper stearate, copper oleate, copper laurate, copper palmitate, copper myristate, zinc stearoyl sarcosinate, zinc oleoyl sarcosinate, zinc palmitoyl sarcosinate, zinc lauroyl sarcosinate, calcium stearoyl sarcosinate, calcium oleoyl sarcosinate, calcium palmitoyl csarcosinate, calcium lauroyl sarcosinate, magnesium stearoyl sarcosinate, magnesium oleoyl sarcosinate, magnesium palmitoyl sarcosinate, magnesium lauroyl sarcosinate, nickel stearoyl sarcosinate, nickel oleoyl sarcosinate, nickel palmitoyl sarcosinate, nickel lauroyl sarcosinate, copper stearoyl sarcosinate, copper oleoyl sarcosinate, copper palmitoyl sarcosinate, copper lauroyl sarcosinate or mixtures thereof as well as the corresponding lithium, iron, aluminum and cobalt salts.

Particularly suitable carboxylic acid salts containing siloxane chains herein include the metal salts, wherein the metal is aluminum, zinc, lithium, copper, iron, cobalt or nickel.

The other critical component of the internal mold release/compatibilizing agent of this invention is a material containing at least one amine group. The amines suitably employed herein include aliphatic, cycloaliphatic or aromatic compounds having at least one, and preferably at least two, amine groups. Aliphatic amines are preferred as being generally more effective at stabilizing the metal salt in a polyahl.

The ability of a particular amine to compatibilize the metal salt is readily determined by blending the metal salt with the amine compound and then mixing the resulting blend with an active hydrogen-containing composition. Compatibilization is achieved when the blend is dissolved or suspended in the active hydrogen containing composition for a time sufficiently long to permit it to be reacted with an isocyanate compound.

The amine compound preferably contains a tertiary nitrogen atom. Compounds containing primary and secondary amine groups are also suitable to compatibilize the metal carboxylate.

In the amine compound, there are preferably at least two alkanol or hydroxy-terminated poly(oxyalkylene) groups attached to the nitrogen atom. Preferably, such amine is an alkylene oxide adduct of either ammonia or a primary amine as represented by the structure

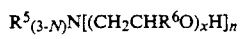  III.

x is a number from about 1 to about 5, preferably 1 to 3. more preferably 1: n is 1, 2 or 3, preferably 2: each R is independently hydrogen, halogen or inertly substituted lower alkyl. $R^5$ and $R^6$ are independently hydrogen, an inertly substituted lower alkyl or aromatic group, an oxide chain, or a nitrogen-containing chain to form a diamine or triamine. In such amines, the structure of the group $R^6$ may depend on the composition of the active hydrogen-containing composition in which the internal mold release composition is used. For example, when the active hydrogen-containing composition comprises a polyether polyol having a substantial proportion of repeating units derived from propylene oxide, a substantial portion of the groups $R^6$ are necessarily methyl groups. Similarly, if a poly(ethylene oxide)polyol is used, a substantial proportion or all of the $R^6$ groups are advantageously hydrogen. Preferred mono-amines include tri(isopropanol)amine, methyl di(isopropanol)amine, ethyl di(isopropanol)amine, phenyl di(isopropanol)amine, triethanol amine, methyl diethanol amine, adducts of ammonia with from about 4 to about 9 moles of propylene oxide, mixtures thereof and the like.

Also suitable as the monoamine are hydroxyalkyl or hydroxy-terminated poly(oxyalkylene) derivatives of cyclic amines, such as N-hydroxypropyl morpholine, N-hydroxyethylmorpholine, and the reaction products of cyclic amines such as morpholine with from about 2 to about 30 moles of ethylene oxide, propylene oxide. mixtures thereof, or the like.

Preferably, the tertiary amine compound contains two or more tertiary nitrogen atoms. Suitable tertiary amine polyethers to be used as part of the internal mold release/compatibilizing agent include alkylene oxide diamines in which the alkylene group is straight chained or branched, having from about 1 to about 30, preferably 2 to about 5, more preferably 2 to about 3 carbon atoms. The alkylene oxide is preferably ethylene oxide, propylene oxide or butylene oxide or mixtures thereof. Most preferred are the reaction products of ethylene diamine with 4 to 12 moles of propylene oxide or a mixture of propylene oxide and ethylene oxide, and hydroxyethyl ethylene diamine reacted with 3 to 9 moles of propylene oxide or a mixture of propylene oxide and ethylene oxide.

Suitable diamines include the reaction products of piperazine and about 2 to 5, preferably about 2 moles of a $C_2$-$C_4$ alkylene oxide, which is preferably propylene oxide or mixtures containing propylene oxide.

Other suitable tertiary amines include, for example, alkylene oxide adducts of aminoalkyl piperazine, $C_2$-$C_4$ alkylene oxide adducts of bis(aminoalkyl)piperazine, N, N', N'' trihydroxyalkyl triazines, poly(alkylene amines) which are reacted with about 1 to 50, preferably about 1 to 10 moles of a $C_2$ to $C_4$ alkylene oxide per amine hydrogen, mixtures thereof and the like.

Suitable compounds having two or more aliphatic amine groups include ethylene diamine, 1,3-diaminopropane, 1,4-diaminobutane, isophoronediamine, diethylenetriamine, aminoethylethanolamine, diaminocyclohexane, hexamethylenediamine, methyliminobispropylamine, iminobispropylamine, bis(aminopropyl)piperazine, aminoethyl piperazine, 1,2-diaminocyclohexane, polyoxyalkyleneamines, bis-(p-aminocyclohexyl)methane, triethylenetetramine, tetraethylenepentamine, mixtures thereof and the like. Also useful are amine-terminated polyethers as are described in U.S. Pat. No. 3,654,370, particularly di-and trifunctional amine-terminated polyethers having a molecular weight from about 100 to 10,000. Those tertiary amines having an average molecular weight from about 400 to about 5,000 are particularly preferred.

Suitable compounds having two or more aromatic amine groups include, for example, 2,4-bis(p-aminobenzyl)aniline, 2,4-diaminotoluene, 2,6-diaminotoluene, diaminodiphenylmethane, 4,4'-diaminodiphenylmethane, naphthalene-1,5-diamine, triphenylmethane-4,4',4''-triamine, 4,4'-dimethylamino)diphenylmethane, 1-methyl-2-methylamino-4-aminobenzene, polyphenylpolymethylene polyamines, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane, 4,4'-methylenebis(2,6-diisopropylaniline), mixtures thereof and the like.

1,4-cyclohexyldiamine, p,p'-diamino cyclohexyl methane and 1,4-aminomethyl cyclohexane are examples of come suitable cycloaliphatic amines.

It will be noted that the hydroxy-terminated tertiary amines will react with a polyisocyanate to form a polyurethane polymer. Thus, in those instances, the amine compound selected as a part of the compatibilizing agent can substitute for all or a part of the polyahl. However, in the practice of the present invention it is preferable to also employ at least one additional polyahl, having no tertiary amine groups, and mix the internal mold release/compatibilizing agent of this invention with at least one such polyahl.

The relative ratios of the aforedescribed metal salt and amine-containing material in the internal mold release/compatibilizing agent are preferably selected such that (a) mold release properties are imparted to a molded polymer prepared in the presence of the internal mold release/compatibilizing agent, and (b) the internal mold release/compatibilizing agent is soluble or stably dispersible in the formulation. It is also preferable that the agent serves to compatibilize the otherwise incompatible polyahl and polyol components present therein. Generally, these criteria are met when the ratio of the combined weight of the metal salt and the additional acid, if any, to the weight of the amine-containing material is from about 1:2 to 1:200, preferably 1:2 to 1:50, more preferably from about 1:2 to 1:20, still more preferably from about 1:2 to about 1:10, and most preferably from about 1:2 to 1:5. However, aromatic amines are usually less efficient at stabilizing the metal salt than aliphatic amines. Thus, when an aromatic amine is used, the weight ratio of metal salt to amine preferably does not exceed about 1:2. The aromatic amines are preferably used in conjunction with an aliphatic amine.

By "stably dispersible" it is meant that the internal mold release/compatibilizing agent is capable of being substantially uniformly dispersed in an active hydrogen containing composition and further, that the agent remains dispersed therein for a period of time sufficient to prepare a molded polymer article by reacting the composition containing the agent with a polyisocyanate or polyisothiocyanate. Since in the practice of this invention it is common to disperse the agent in an active hydrogen-containing composition (sometimes referred to herein as the "B-side" of the formulation), prior to the subsequent use thereof to form a molded article, it is preferred that the composition containing the agent be relatively storage stable. Advantageously the agent composition remains stably dispersed in the "B-side" for at least one hour, preferably at least 1 day, more preferably at least 3 days, and most preferably, relatively indefinitely, i.e., for a period of weeks or months. Such longer periods of stability permit the formulation of an active hydrogen-containing composition of the present invention containing the agent and subsequent shipment and storage thereof.

It will be noted that many of the foregoing polyamine compounds are known to be useful reactants in conventional polyurethane and/or polyurea formulations. In particular, the relatively low molecular weight polyamines (i.e., less than about 1,000 molecular weight) are commonly employed in polyurethane and/or polyurea formulations as "chain extenders" or "cross-linkers". Thus, the amine-containing material normally functions as a reactant in the polymer-forming reaction, becoming part of the polymer network.

Accordingly, the most preferred amine-containing materials for use in the agent are those which are known to provide desirable properties when incorporated into a polyurethane and/or polyurea polymer. The most preferred amine-containing materials are hydroxy-terminated (poly)oxyalkylene amines or tertiary amines.

In a preferred embodiment, the agent comprises a hydroxy-terminated (poly)oxyalkylene amine or tertiary amine having a molecular weight of from about 200 to about 500 and a metal salt of a $C_{10}$-$C_{18}$ fatty acid in a ratio of from about 1:1 to about 5:1, preferably about 2:1, respectively. Such embodiment is often employed in a system containing as a polyahl a polyether polyol, which may be capped with propylene oxide, propylene oxide and ethylene oxide, ethylene oxide, butylene oxide or the like.

The amine compound chosen may be an aminated polyol. Such a formulation may be extended with a low molecular weight polyol such as ethylene glycol or another amime such as diethyltoluenediamine.

In addition to the aforementioned metal salt and amine-containing material, it is often advantageous to employ in the compositions of the present invention an additional quantity of an acid as described hereinbefore which is not complexed with a metal. This "free acid" can replace a portion of the metal salt or be used in addition thereto. Any of the aforedescribed acids are useful for this purpose, but preferred are stearic acid, oleic acid, lauric acid, palmitic acid, stearyl sarcosine, oleoyl sarcosine, palmitoyl sarcosine, lauroyl sarcosine, mixtures thereof and the like.

The use of the additional acid is, in certain circumstances, preferred. For example, when the reactants (i.e., polyahl(s) and polyisocyanates) are hand-mixed prior to molding, it has been found preferable to include an additional acid in the formulation. Similarly, the use of the additional acid is often preferred when certain types of external mold release agents, primarily waxes, are used in conjunction with the compositions of the present invention. Also, the use of the additional acid has been found to, in some cases, increase the "green strength" of the molding, i.e., increase its stiffness upon demold. The use of external mold releases in conjunction with the compositions of the invention is discussed more fully hereinafter.

The additional acid, when desirable, is preferably used in an amount from about 0.25 to about 1.5 times the weight of the metal salt.

In one preferred embodiment of the present invention containing an additional "free" acid, an aminated polyether having a molecular weight of from about 200 to about 10.000, a metal salt of a $C_{10}$–$C_{18}$ fatty acid, and an amido-containing carboxylic acid are combined with a mixed chain-extender comprising an aromatic diamine and a relatively low molecular weight polyol such as ethylene glycol. Such embodiment contains about 2 to 10 parts of the aminated polyether, about 1 to 3 parts of the metal salt and about 1 to 3 parts of the additional "free acid".

The agent useful in this invention is advantageously prepared by simply blending the metal salt, additional free acid, if any, and amine-containing compound at the ratios indicated herein. Since many of the metal salts, particularly the fatty acid salts and amido-containing acid salts, are solids at ambient temperatures, it is desirable to conduct such blending at elevated temperatures, preferably no greater than about 125° C.

More typically, the agent is employed in conjunction with one or more active hydrogen containing materials (referred to herein as "polyahls") in preparing a molded polyurethane. A significant advantage of this invention is that the agent is soluble or stably dispersible in relatively high molecular weight polyahls with which the relatively lower molecular weight polyol is normally incompatible and/or is incompatible in the proportions employed.

Blending of the agent into the active hydrogen containing composition is facilitated, particularly if the molder is doing the blending, by the preparation of a "concentrate" of the agent of the invention in a relatively small amount of the relatively high molecular weight polyahl and/or the relatively low molecular weight polyol. In making such concentrate, sufficient of the active hydrogen containing material is employed to dissolve or stably disperse the agent. Typically, the combined weight of the metal salt and optional additional free acid constitutes about 5 to about 50 percent by weight of the concentrate.

As another alternative, the internal mold release/compatibilizing agent can be prepared in situ in the polyahl and/or polyol by sequentially dissolving or dispersing the amine-containing material and metal salt therein. In preparing the active hydrogen-containing composition in this manner, it is generally necessary to first add the amine-containing material to the selected component.

Sufficient of the agent is preferably employed in the preparation of the molded polyurethane and/or polyurea polymer to provide mold release and compatibilizing characteristics thereto. Generally, sufficient of the agent is present when the metal salt and additional free acid, if any, together comprise from about 0.5 to about 20, preferably from about 1 to about 10, percent of the combined weight of the agent composition and active hydrogen-containing compounds, i.e., polyahl(s) and polyol(s), used in preparing the molded polymer.

The polyahl employed herein is a compound or mixture of compounds containing a plurality of Zerewitinoff hydrogens (i.e., hydrogen atoms displaying significant activity according to the Zerewitinoff test described by Kohler in the *Journal of the American Chemical Society*, Vol. 49, 3191 (1927)). Compounds containing such hydrogens include polyols, polyacids, polymercaptans and the like. Of these, polyols are generally preferred on the basis of more ready availability and lower cost.

In the practice of the present invention the polyahl may be one in which the metal acid salt component is not soluble or stably dispersible in the absence of the amine-containing material. For this reason, the most preferred polyahl comprises a major portion of a polyol which is substantially devoid of amine groups. The most preferred polyahl can include a minor portion of a polyamine or amine-initiated polyol therein. The characteristics of the polyahl employed depend to a large extent on the desired physical properties of the polymer prepared therefrom. In the practice of the present invention it should be understood that it is the relative difference between the molecular weights of the polyahl and polyol that leads to the incompatibility between them in certain proportions, and that the use of the internal mold release/compatibilizing agent serves to compatibilize these components, and not the precise molecular weights of the components individually. However, such incompatibility is often seen when the relatively high molecular weight polyahl has a molecular weight greater than about 1,000 and the relatively low molecular weight polyol has a molecular weight less than about 1,000. Further direction as to the choice of the relatively low molecular weight polyol is provided hereinafter. The relatively high molecular weight polyol has a molecular weight more preferably greater than about 2,000, and most preferably greater than about 4,000. Preferred ranges are molecular weights from about 1,000 to about 10,000, more preferably from about 2,000 to about 9,000, and most preferably from about 4,000 to about 8,000.

Suitable polyahls include polyether polyols, polyester polyols, polyhydroxyl-containing phosphorus compounds, hydroxyl-terminated acetal resins, hydroxyl terminated amines and polyamines, the corresponding amine-terminated polyether and/or polyester polyols, the so-called polymer or copolymer polyols which comprise a dispersion of an addition polymer as copolymer in a continuous polyahl phase, as well as other active hydrogen-containing compounds which are known to be useful in the preparation of polyurethanes polymers. Examples of these and other suitable polyahls are described more fully in. e.g., U.S. Pat. No. 4,394,491. particularly in columns 3–5 thereof. Suitable copolymer polyols include those described in U.S. Pat. No. RE 28,118 and 4,324,491. Of these, the polyester polyols and particularly the polyether polyols are preferred.

Suitable relatively high molecular weight polyether polyols which can be employed herein include those which are prepared by reacting an alkylene oxide, halogen substituted or aromatic substituted alkylene oxides or mixtures thereof with an active hydrogen-containing initiator compound. Suitable such oxides include, for example, tetrahydrofuran, ethylene oxide, propylene oxide, 1,2-butylene oxide, 2,3-butylene oxide, styrene oxide, epichlorohydrin, epibromohydrin, mixtures thereof and the like.

Suitable initiator compounds include water, ethylene glycol, propylene glycol, butanediol, exanediol, glycerine, trimethylol propane, pentaerythritol, hexanetriol, sorbitol, sucrose, hydroquinone, resorcinol, catechol, bisphenols, novalac resins, phosphoric acid, mixtures thereof and the like.

Also suitable as initiators for the relatively high molecular weight polyols are, for example, ammonia, glycerine, water, propylene glycol, sucrose, ethylenediamine, diaminopropane, diaminobutane, diaminopentane, diaminohexane, diethylethanolamine, diethylenetriamine, triethylenetetramine, tetraethylenepentamine, pentaethylenehexamine, ethanolamine, aminoethylethanolamine, aniline, 2,4-toluenediamine, 2,6-toluenediamine, diaminodiphenyloxide (oxydianiline), 2,4'-diaminodiphenylmethane, 4,4'-diaminodiphenylmethane, 1,3-phenylenediamine, 1,4-phenylenediamine, naphthylene-1,5-diamine. triphenylmethane-4,4'.4|-triamine, 4,4'-di(methylamino)-diphenylmethane, 1-methyl-2-methylamino-4-aminobenzene, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane and amine aldehyde condensation products such a the polyphenyl-polymethylene polyamines produced from aniline and formaldehyde, mixtures thereof and the like.

Suitable polyester polyols which can be employed herein include, for example, those prepared by reacting a polycarboxylic acid or anhydride thereof with a polyhydric alcohol. The polycarboxylic acids can be aliphatic, cycloaliphatic, aromatic and/or heterocyclic and may be substituted (e.g., with halogen atoms) and/or unsaturated. Examples of carboxylic acids of this kind include succinic acid: adipic acid: suberic acid: azelaic acid: sebacic acid: phthalic acid: isophthalic acid; trimellitic acid: phthalic acid anhydride: tetrahydrophthalic acid anhydride: hexanydrophthalic acid anhydride: tetrachlorophthalic acid anhydride: endomethylene tetrahydrophthalic acid anhydride: glutaric acid anhydride: maleic acid: maleic acid anhydride: fumaric acid: dimeric and trimeric fatty acids: such as oleic acid, which may be in admixture with monomeric fatty acids: terephthalic acid dimethyl ester: terephthalic acid bisglycol ester: and the like. Mixtures of such acids or anhydrides can also be employed. The polyesters can contain some terminal carboxyl groups. It is also possible to use polyesters of lactones such as caprolactone, or hydroxy carboxylic acids such as hydroxy caproic acid.

Other suitable relatively high molecular weight polyols which can be employed herein include polymer-containing polyols such as, for example, those disclosed in U.S. Pat. Nos. RE 29,118, RE 28,715, RE 29,014, U.S. 3,869,413, U.S. 4,394,491 and U.S. 4,390,645, all of which are incorporated herein in their entireties by reference.

A feature of the present invention is the inclusion of at least one suitable relatively low molecular weight polyol along with a relatively high molecular weight polyol. The relatively low molecular weight polyol is one which, in the applicable proportions, is incompatible with the relatively high molecular weight polyahl. Such incompatibility is manifested, as discussed hereinabove, as cloudiness or other evidence of phase separation at some point after the two classes of materials are mixed in the absence of the internal mold release/compatibilizing agent.

The relatively low molecular weight polyols which can be employed herein preferably have molecular weights of less than or equal to about 1,000. more preferably less than about 800 and most preferably less than about 600. Preferred ranges include from about 50 to about 1,000, more preferably from about 50 to about 400 and most preferably from about 50 to about 300. Examples include polyhydric alcohols such as ethylene glycol, 1,2-propylene glycol: 1,3-propylene glycol: 1,4-, 1,2- and 2.3-butylene glycol; 1,6-hexane diol: 1,8-octane diol: neopentyl glycol: cyclohexane dimethanol: (1,4-bis-hydroxymethyl cyclohexane): 2-methyl-1,3-propane diol: cyclohexane dimethylol: glycerol: trimethylol propane: 1,2,6-hexane triol: 1,2,4-butane triol: trimethylol ethane: pentaerythritol: quinitol: mannitol: sorbitol: methyl glycoside: diethylene glycol: triethylene glycol: tetraethylene glycol: polyethylene glycol: dipropylene glycol: polypropylene glycol; dibutylene glycol: polybutylene glycol, 1,4-butane diol, diethylene glycol, dipropylene glycol, bisphenol, hydroquinone, catechol, resorcinol, triethylene glycol, tetraethylene glycol, dicyclopentadienediethanol, glycerine, low molecular weight ethylene and/or propylene oxide derivatives of glycerine, ethylene diamine, diethylene triamine, mixtures thereof and the like.

Also useful relatively low molecular weight materials are the amine-containing materials described hereinbefore, particularly low molecular weight amine-terminated polyethers and aromatic polyamines. Thiol analogues of the aforementioned relatively low molecular weight polyols are also suitable.

Suitable polyisocyanates include the organic aromatic polyisocyanates, aliphatic polyisocyanates or mixtures thereof. Suitable organic aromatic polyisocyanates which can be employed herein include, for example, any such polyisocyanate having 2 or more NCO groups per molecule such as, for example, 2,4-toluenediisocyanate, toluenediisocyanate, p,p'-diphenylmethanediisocyanate. p-phenylenediisocyanate, naphthalenediisocyanate, polymethylene polyphenylisocyanates, mixtures thereof and the like.

Also suitable as organic aromatic and/or aliphatic polyisocyanates are the prepolymers prepared from such polyisocyanates and compounds having 2 or more active hydrogen atoms: as well as such polyisocyanates and/or prepolymers thereof which have been modified to contain uretonimine or carbodiimide linkages.

Suitable organic aliphatic polyisocyanates include, in addition to the hydrogenated derivatives of the above mentioned organic aromatic polyisocyanates, 1,6-hexamethylene diisocyanate, isophorone diisocyanate, 1,4-cyclohexyl diisocyanate, 1,4-bis-isocyanatomethylcyclohexane diisocyanate, p- and m-tetramethylxylene diisocyanate, mixtures thereof and the like.

Also suitable are the corresponding polyisothiocyanates.

The polymers can be prepared either in the presence or absence of a catalyst. Those polymers prepared from amine containing polyols do not usually require a catalyst, although catalysts can be employed if desired. Polymers prepared from polyols which do not contain nitrogen atoms are more typically prepared in the presence of a catalyst.

Suitable catalysts which can be employed herein include, for example, organo-metal compounds, tertiary amines, alkali metal alkoxides, mixtures thereof and the like. Suitable organo-metal catalysts include, for example, organo-metal compounds of tin, zinc, lead, mercury, cadmium, bismuth, antimony, iron, manganese, cobalt, copper, vanadium and the like, such as, for example, metal salts of a carboxylic acid having from about 2 to about 20 carbon atoms. These include, for example, stannous octoate, dimethyltin dilaurate, dibutyltin dilaurate, dibutyltin diacetate, ferric acetyl acetonate, lead octoate, lead oleate, phenylmercuric propionate, lead naphthenate, manganese naphthenate, copper naphthenate, vanadyl naphthenate, cobalt octoate, cobalt acetate, copper oleate, vanadium pentoxide, mixtures thereof and the like.

Suitable amine catalysts include, for example, triethylenediamine, triethylamine, tetramethylbutanediamine, N,N-dimethylethanolamine, N-ethylmorpholine, bis-(2-dimethylaminoethyl)ether, N-methylmorpholine, N-ethylpiperidine, 1,3-bis-(dimethylamino)-2-propanol, N,N,N',N'-tetramethylethylenediamine, pentamethyldiethylenetriamine, substituted thioureas, mixtures thereof and the like.

Suitable alkali metal alkoxides which can be employed as catalysts for urethane formation include. for example, sodium ethoxide, potassium ethoxide, sodium propoxide, potassium propoxide, sodium butoxide, potassium butoxide, lithium ethoxide, lithium propoxide. lithium butoxide, alkali metal salts of polyols such as described in U.S. Pat. No. 3,728,308, mixtures thereof and the like.

Preferably, these catalysts are in liquid form. Catalysts which are solid at applicable temperatures are preferably first dissolved in an appropriate liquid, such as, for example, dipropylene glycol. Alternatively, the catalyst can be dissolved or dispersed in one of the active hydrogen-containing materials.

The amine catalysts, when employed, can be used in quantities of from about 0.001 to about 5, preferably from about 0.01 to about 1, part per 100 parts of total polyol, depending upon the activity of the catalyst. Very weak catalysts could possibly be employed in quantities above 5 parts per 100 parts of polyol. The organo metallic catalysts are generally used in smaller amounts, i.e., about 0.001 to 2, preferably about 0.01 to 0.5, more preferably about 0.01 to 0.30, parts per 100 parts by weight polyol.

If desired, the polyurethanes can be modified to include isocyananurate or thioisocyanurate groups by employing relatively high proportions of NCO or NCS to active hydrogen ratios, e.g., greater than about 1.5:1, preferably greater than about 2:1, and at the same time employing a trimerization catalyst. Suitable trimerization catalysts which can be employed herein include, for example, the zwitterions, such as are disclosed in U.S. Pat. No. 4,111,914, and the tertiary amines, alkali metal salts of lower alkanoic acids, mixtures thereof and the like, such as are disclosed in U.S. Pat. No. 4,126,741. The zwitterions can also catalyze the urethane-forming reaction.

The present invention includes a blowing agent which acts to reduce the density of the final article. In one particularly preferred embodiment of the present invention the blowing agent is water, which produces carbon dioxide and foams the formulation prior to gelation. It is well-known in the art that, in general, water tends to be incompatible in combination with relatively high molecular weight polyahls such as are described hereinabove. Preparation of the compositions of the present invention results in a compatible system comprising water, a relatively high molecular weight polyol and a relatively low molecular weight polyol without undesirable increase in reactivity level.

Additional blowing agents can also be used if desired, to substitute or supplement the blowing action supplied by the water. A number of suitable such blown agents include, for example, nitrogen, air, low-boiling halocarbons such as the halogenated methanes including trichlorofluoromethane and other chlorofluorocarbon compounds, hydrocarbon compounds such as pentane, dimethyl ether and diethyl ether, the hydrohalocarbon compounds, finely divided solids, so-called "azo" blowing agents such as azobis(formamide), and the like, and other agents known to those skilled in the art. Of these alternative or supplemental blowing agents trichlorofluoromethane is preferred. Suitable halocarbon blowing agents include, for example, blowing agents having boiling points of from about −30° C. to about 110° C., such as dichlorodifluoromethane, chlorodifluoromethane, 1,1,2-trichloro-1,2,2-trifluoroethane, 1,1-dichloro-2,2,2-trifluoroethane, 1,1-dichloro-1-fluoroethane, 1,1,1,2-tetrafluoroethane, 1,2-dichlorotetrafluoroethane, 1,1-difluoroethane, 1-chloro-1,1difluoroethane, 1,1,1-trichloroethane, 1,1,2-trichloroethane, and 1,1-dichloroethane. If water is selected as the sole blowing agent it is preferably added in an amount of at least about 0.1 percent by weight based on the total "B" side of the formulation, more preferably from about 0.1 to about 10 percent by weight, still more preferably from about 1 to about 6 percent by weight, and most preferably from about 1 to about 4 percent. If trichlorofluoromethane or another low-boiling halogenated material is selected as the sole blowing agent it is preferably added in an amount of less than about 30 percent by weight of the "B" side, more preferably less than about 25 percent by weight. and most preferably from about 10 to about 20 percent by weight. As used herein, the "B" side of the formulation includes all components of a p lyurethane or polyurea/polyurethane formulation except the polyisocyanate.

Further density reduction can be accomplished by "frothing" by injecting an inert gas into the mixture of polymer-forming components. Suitable such inert gases include, for example, nitrogen, carbon dioxide, xenon, helium, mixtures thereof such as air and the like.

If desired, surfactants can also be employed, particularly in preparing foams or microcellular products of reduced density and/or to assist in paintability of the final article. The surfactants contribute to control of cell size and morphology. Suitable surfactants commonly used by those skilled in the art include, for example, silicone oils.

The polyurethanes and other polymeric products may additionally contain, if desired, coloring agents, pigments, fire retardant agents, fillers and other modifiers. Particularly suitable filler substances are fiberglass, graphite, metal, flake glass, milled glass, or particulate polymeric reinforcement materials, particularly those having lengths of from about 1/16 inch (0.16 cm) to about ½ inch (1.27 cm) and milled fibers having a maximum length of 1/16 inch (0.16 cm), ⅛ inch (0.32 cm) and ¼ inch (0.64 cm) and the like. Other particularly suitable fillers are mica, wollastonite, calcium carbonate, barium sulfate, mixtures thereof and the like.

The components which react to form the polymeric products ca be shaped or formed into useful articles by injecting the reactive mixture into molds which are capable of withstanding the exotherm of the reaction and which which do not react or dissolve upon contact with the reaction mixture. Particularly suitable molds are those made of metals such as aluminum, copper, brass, steel and the like. In some instances non-metal molds can be employed such as those made of, for example, polyethylene, polypropylene, epoxy, polyethylene terephthalate, silicone elastomers and the like. Those skilled in the art will understand the formulation and processing variables indicating a particular mold material choice.

Although an untreated mold can be used herein, it is often desirable, upon beginning to prepare a series of molded parts according to this invention, to treat the mold with an external mold release agent such as a soap or a wax. Such external mold release is commonly employed before the first molding is made and sometimes following the first one of two moldings. After the first molding or first couple of moldings, use of an external mold release agent may be desirable periodically, i.e., after every 10-100 moldings. However, in many cases, satisfactory release is seen with the invention even when no external mold release is applied. By contrast, without the use of the internal mold release/compatibilizing formulations of the present invention, an external mold release is normally required for each or each few moldings.

As mentioned hereinbefore, when wax-based external mold releases are used it is usually preferable to use an additional free acid as one component of the internal mold release/compatibilizing agent. With a soap-based external mold release, it is generally preferred to omit the additional acid.

The compositions of the present invention are applicable both to reduced density, preferably water-blown moldings comprising the components identified as required herein, as well as to reduced density, preferably water-blown, fiber-reinforced moldings of the same constituency. These include, for example, moldings based on fiber mats and "preforms" made of fiberglass, polyester and the like, as well as those containing particulate fiber reinforcement. Thus, the present invention finds particular application in so-called low density reinforced RIM.

The compositions of the present invention are also suitable for use in preparing foamed polyurethane moldings having an integral skin. For these formulations the blowing agent is generally a halocarbon such as trichlorofluoromethane or a related compound.

When injecting a relatively rapid-setting blend into larger metal molds, it may be preferable to preheat the molds to an appropriate temperature so that the mold will not absorb the heat of polymerization from the reaction mixture and delay the solidification time expected of a given formulation. Such treatment may be desirable to improve the surface characteristics of the final article.

A desirable feature of the compositions of the present invention is their ability to adhere to vinyl-based polymers. For example, these compositions exhibit surprising and unexpected improvements in adhesion to polyvinyl chloride, polyvinylidene chloride and related vinyl-based polymers.

In view of the mold release and other physical properties of the compositions of the present invention as described hereinabove, these compositions find particular application in automotive interior parts, such as low density mat molded interior door panels: other automotive interior parts such as armrests, dashboards and instrument panels: shelving: exterior automotive fascia and body trim; automotive quarter panels: and various automotive exterior parts.

The following examples are provided to more fully illustrate the present invention. As such they are not intended to be, nor should they be construed as being, limitative of its scope in any way. All parts and percentages are by weight unless otherwise indicated.

EXAMPLE 1

A polyol formulation containing the components and proportions shown in Table 1 is prepared.

TABLE 1

| Component | Amount (Parts by Weight) |
| --- | --- |
| Polyether Polyol A[1] | 55 |
| Polyether Polyol B[2] | 10 |
| Zinc Laurate | 5 |
| Ethylene Glycol | 15 |
| Water | 2.8 |
| Silicone Surfactant[3] | 1.0 |
| Catalyst[4] | 0.60 |

[1] Polyether Polyol A is a 5,000 molecular weight, glycerine-initiated, ethylene oxide-capped polyol.
[2] Polyether Polyol B is a 350 molecular weight, amine-initiated polyol.
[3] Silicone Surfactant is TEGOSTAB B-8404*, available from Goldschmidt Chemical Company.
[4] Catalyst is a mixture of POLYCAT 9* and POLYCAT 5*, available from Air Products and Chemicals, Inc.

The components are maintained at ambient temperature (about 60°-75° F.) and then reacted with a polymeric methylene diphenyl diisocyanate having an average functionality of about 2.7, in a ratio of 1.41 parts isocyanate to 1 part of the polyol formulation, to form a polyurethane. The isocyanate is added to the polyol formulation and mixed at 2,500 rpm for about 7 seconds.

A mold is prepared by treating with an external mold release agent (CHEMTREND CT-2002*. a product of Chemtrend, Inc.). A continuous strand fiberglass reinforcing mat, having a weight of 1.5 ounce per square foot, is then placed in the mold cavity and brought to 160° F. A portion of the reaction mixture including polyol formulation and isocyanate is then poured over the fiberglass reinforcing mat in the mold cavity and the mold is closed. After 80 seconds the mold is opened and the finished part removed.

Using the same mold, nineteen separate additional, consecutive pours of the same formulation, each using a fiberglass reinforcing mat, are then done, without additional application of the external mold release agent. The experiment is stopped arbitratily after twenty pours. All twenty pours result in molded, foamed polyurethane parts which release easily from the mold without tearing or deformation.

EXAMPLE 2

Parts are prepared from a formulation identical to that shown in Example 1, and processed by reaction injection molding using a Krauss Maffei PU-40 reaction injection molding apparatus with a Krauss Maffei 10-4K mixhead. Flow rate of the components is 0.5 to 4 pounds per second. The mold is a polished steel mold with a center gate measuring 22×40×0.25 inches. Mold temperature is maintained at from 160° to 170° F., and introduction temperature of the components is from 70° to 75° F. Impingement Pressure is 1,500 to 2,000 psi. Twenty-six successive parts are prepared and released without significant tearing or deformation of the parts. The test is stopped arbitrarily at this point. One part is subjected to physical property testing. The results are as shown in Table 2.

TABLE 2

| Property | Value |
| --- | --- |
| Thickness (in.) | 0.2 |
| Specific Gravity | 0.3915 |
| Percent Glass | 14.5 |
| Flexural Modulus (psi, 0.5 in./min. crosshead speed at room temperature) | 68,130 |
| Flexural Strength (psi, 0.5 in./min. crosshead speed at room temperature) | 2,187 |

TABLE 2-continued

| Property | Value |
| --- | --- |
| Gardner impact (in.-lbs. at room temperature) | 52 |
| Dimensional Stability (% change, 24-hour water soak at room temperature) | 0.0 |

Comparative Example 3

Six successive parts are prepared exactly as in Examples 1, except that no zinc laurate is used. The parts are progressively more difficult to remove from the mold, and the sixth pour part becomes torn and severely deformed in removing it.

Comparative Example 4

A polyol formulation of the present invention identical to that shown in Example 1, Table 1, is prepared (SAMPLE A) and allowed to stand for about 12 hours. The formulation is homogeneous and clear yellow in color.

A comparative polyol formulation identical to that shown in Example 1, Table 1, except without any zinc laurate, is also prepared (SAMPLE B) and allowed to stand for about 12 hours. The polyol formulation is cloudy.

Another comparative polyol formulation identical to that shown in Example 1, Table 1, except without any zinc laurate and with 15 parts (rather than 10 parts) of Polyether Polyol B is prepared (SAMPLE C) and allowed to stand for about 12 hours. The polyol formulation is separated into two distinct phases, one larger, cloudy upper phase, and one smaller, clear and colorless lower phase.

Another comparative polyol formulation similar to that shown in Example 1, Table 1, is prepared (SAMPLE D) except no Polyether Polyol B is used; no zinc laurate is used; and no ethylene glycol is used. In addition, water is employed in an amount of about 5.5 parts, based on weight of polyol, and 0.4 parts of catalyst is used. After standing for about 12 hours, the formulation is cloudy.

Finally, another comparative polyol formulation similar to that shown in Example 1, Table 1, is prepared (SAMPLE E) except no ethylene glycol is used: water is used in an amount of 5.5 parts based on weight of polyol, and catalyst is present in an amount of 0.4 parts. After standing for about 12 hours the formulation is clear.

The above results are summarized in Table 3.

TABLE 3

| Component | SAMPLE A | SAMPLE B | SAMPLE C | SAMPLE D | SAMPLE E |
| --- | --- | --- | --- | --- | --- |
| Polyether Polyol A[1] | 55 | 55 | 55 | 55 | 55 |
| Polyether Polyol B[2] | 10 | 10 | 15 | 0 | 10 |
| Zinc Laurate | 5 | 0 | 0 | 0 | 5 |
| Ethylene Glycol | 15 | 15 | 15 | 0 | 0 |
| Water | 2.8 | 2.8 | 2.8 | 5.5 | 5.5 |
| Surfactant | 1.0 | 1.0 | 1.0 | 1.0 | 1.0 |
| Catalyst | 0.60 | 0.6 | 0.6 | 0.4 | 0.4 |

Comparative Example 5

A polyurethane foam is prepared as shown in Example 1, containing zinc laurate, except that a trilaminate expanded polyvinyl chloride sheet, available from GenCorp, is placed in the mold prior to the pur. A second foam is prepared using the formulation of Example 3, containing no zinc laurate, and poured with a similar trilaminate expanded polyvinyl chloride sheet in the mold. The final products, which are foam/polyvinyl chloride laminates, are then tested according to the procedures of ASTM D-413, using 180-degree peel of a 2 inch by 6 inch-strip. The results are shown in Table 4.

TABLE 4

| Tear Strength | With Zinc Laurate | Without Zinc Laurate |
| --- | --- | --- |
| With grain (pounds per linear inch, pli) | 27.19 | 25.50 |
| Against grain (pounds per linear inch, pli) | 33.23 | 22.39 |

EXAMPLE 6

Another formulation is prepared using Refrigerant-22 (R-22), a hydrochlorofluorocarbon, in addition to water as a blowing agent. The formulation is as shown in Table 5.

TABLE 5

| Component | Amount (Parts by Weight) |
| --- | --- |
| Polyether Polyol C[1] | 61 |
| Polyether Polyol D[2] | 23 |
| 1,4-Butanediol | 7.2 |
| JEFFAMINE ED-600*[3] | 2.7 |
| Triethylene Diamine[4] | 2.45 |
| R-22[5] | 1.8 |
| Water | 0.05 |
| Silicone Surfactant[6] | 0.5 |
| Zinc laurate[7] | 1.35 |

[1]Polyether Polyol C is a 4,000 molecular weight, random fed ethylene oxide/propylene oxide diol.
[2]Polyether Polyol D is a 5,000 molecular weight, glycerine-initiated ethylene oxide/propylene oxide fed triol.
[3]JEFFAMINE ED-600* is an aminated polyoxyalkylene diol available from Texaco Chemicals, Inc.
[4]Present as a 33% solution in 1,4-butanediol.
[5]R-22 is FORANE 22*, which is chloro-difluoromethane available from Atachem Corp.
[6]Silicone Surfactant is TEGOSTAB B-4113*, available from Goldschmidt Chemical Company.
[7]Zinc laurate is FOMREZ UL-41*, available from Witco Corporation.

Using the method of Example 1 the components in Table 5 are reacted with a prepolymer prepared from 100 parts by weight ISONATE m-125*, which is a methylene diphenyl diisocyanate blend consisting of 98 percent 4,4'- isomer and 2 percent 2,4'- isomer, available from The Dow Chemical Company, and 12 parts by weight dipropylene glycol at an isocyanate index of 100. The reaction mixture is then poured into aluminum molds using conventional low-pressure processing techniques and application of a conventional external mold release agent for the first pour only. After seven consecutive pours the mold is examined and no noticeable fouling is seen. The seventh and all previous parts are removed from the mold without significant tearing or deformation.

Comparative Example 7

Three different formulations containing R-22 and relatively small amounts of water as blowing agents are compared, and the procedures described in Example 6 are used. The formulations are shown in Table 6.

TABLE 6

| Component | Formulation A (Parts by Weight)** | Formulation B (Parts by Weight) | Formulation C (Parts by Weight) |
| --- | --- | --- | --- |
| Polyether Polyol C[1] | 55 | 59 | 61 |
| Polyether Polyol D[2] | 7 | 22 | 23 |
| Polyether Polyol E[3] | 20 | 0 | 0 |
| Polyether Polyol F[4] | 3 | 0 | 0 |
| 1,4-Butanediol | 7.5 | 7.1 | 7.2 |
| JEFFAMINE ED-600*[5] | 0 | 2.7 | 2.7 |
| Triethylene Diamine[6] | 1.6 | 2.4 | 2.45 |
| R-11[7] | 4.5 | 4.8 | 0 |
| R-22[8] | 0 | 0 | 1.8 |
| Water | 0.25 | 0.15 | 0.05 |
| Silicone Surfactant[9] | 0.5 | 0.5 | 0.5 |
| NIAX A-1*[10] | 0.05 | 0 | 0 |
| DABCO T-12*[11] | 0.01 | 0 | 0 |
| Zinc laurate[12] | 0 | 1.35 | 1.35 |

**not an example of the present invention
[1]See Table 5, footnote 1.
[2]See Table 5, footnote 2.
[3]Polyether Polyol E is a copolymer polyol having a 25% solids content (70% styrene and 30% acrylonitrile) and a hydroxyl number of 26.
[4]Polyether Polyol F is a 19% propylene oxide/81% ethylene oxide triol having 1.01 percent hydroxyl content.
[5]See Table 5, footnote 3.
[6]See Table 5, footnote 4.
[8]See Table 5, footnote 5.
[9]See Table 5, footnote 6.
[10]NIAX A-1* is 70 percent bis(dimethylaminoethylether) and 30 percent dipropylene glycol, available from Union Carbide Corp.
[11]DABCO T-12* is dibutyltin dilaurate, available from Air Products and Chemicals, Inc.
[12]See Table 5, footnote 7.

Processing is continued as described in Example 6 with reaction with the same isocyanate blend at the same index. It is found that the conventional external mold release agent needs to be reapplied to the aluminum molds to prevent fouling and/or tearing or deformation of the part upon demold with the following frequencies: For Formulation A (the comparative formulation without the internal mold release/compatibilizing agent) the external mold release agent needs to be reapplied for every new molding: for Formulation B the external mold release is desirably reapplied after each fifth molding: and for Formulation C the external mold release agent is desirably reapplied after each seventh molding.

What is claimed is:

1. A composition for preparing a molded foamed polymeric article comprising (1) a relatively high molecular weight polyahl and a relatively low molecular weight polyol, in proportions such that the relatively high molecular weight polyahl and the relatively low molecular weight polyol are incompatible, (2) a polyisocyanate, (3) a blowing agent, and (4) an internal mold release/compatibilizing agent containing (a) a metal salt of an acid, wherein the metal is selected from elements of the Periodic Table of the Elements having Atomic Numbers 3-5, 11-14, 19-34, 37-52, 55-57, and 72-84, and (b) a compound containing at least one amine group, wherein the internal mold release/compatibilizing agent is present in an amount sufficient to provide mold release characteristics to the article and to compatibilize the relatively high molecular weight polyahl and the relatively low molecular weight polyol.

2. The composition of claim 1 wherein relatively high molecular weight polyahl is a polyether or polyester polyol having an average molecular weight of greater than about 1,000.

3. The composition of claim 1 wherein the relatively high molecular weight polyahl is polyether or polyester polyol.

4. The composition of claim 1 wherein the amine-containing compound is an aliphatic or aromatic tertiary amine.

5. The composition of claim 1 wherein the relatively low molecular weight polyol has an average molecular weight of less than or equal to about 1,000.

6. The composition of claim 1 wherein the relatively low molecular weight polyol has an average molecular weight of less than about 250.

7. The composition of claim 1 wherein the relatively low molecular weight polyol is ethylene glycol, propylene glycol, trimethylol propane, 1,4-butane diol, diethylene glycol, dipropylene glycol, bisphenol, hydroquinone, catechol, resorcinol, triethylene glycol, tetraethylene glycol, cyclohexane dimethylol, dicyclopentadienediethanol, glycerine, ethylene diamine, diethylene triamine, or a mixture thereof.

8. The composition of claim 7 wherein the relatively low molecular weight polyol is ethylene glycol.

9. The composition of claim 1 wherein the blowing agent is water, a halocarbon compound, or a mixture thereof.

10. The composition of claim 9 wherein the blowing agent is water.

11. The composition of claim 10 wherein the water and relatively high molecular weight polyahl are present in proportions such that they are incompatible, and the internal mold release/compatibilizing agent is present in an amount also sufficient to compatibilize them.

12. The composition of claim 1 wherein the metal salt of an acid is zinc laurate, zinc stearate, zinc oleate, zinc palmitate, calcium laurate, calcium oleate, calcium palmitate, calcium stearate, magnesium laurate, magnesium stearate, magnesium oleate, magnesium palmitate, nickel laurate, copper stearate, copper oleate, copper laurate, copper palmitate, zinc stearoyl sarcosinate, zinc oleoyl sarcosinate, zinc palmitoyl sarcosinate, zinc lauroyl sarcosinate, calcium stearoyl sarcosinate, calcium oleoyl sarcosinate, calcium palmitoyl sarcosinate, calcium lauroyl sarcosinate, magnesium stearoyl sarcosinate, magnesium oleoyl sarcosinate, magnesium palmitoyl sarcosinate, magnesium lauroyl sarcosinate, nickel stearoyl sarcosinate, nickel oleoyl sarcosinate, nickel palmitoyl sarcosinate, nickel lauroyl sarcosinate, copper stearoyl sarcosinate, copper oleoyl sarcosinate, copper palmitoyl sarcosinate, copper lauroyl sarcosinate, zinc myristate, calcium myristate, nickel myristate, magnesium myristate, copper myristate, or mixtures thereof.

13. The composition of claim 11 wherein the metal salt of an acid is zinc laurate, zinc stearate, zinc oleate, zinc palmitate, zinc myristate, or a mixture thereof.

14. The composition of claim 1 further comprising a fiber reinforcing mat.

15. The composition of claim 1 further comprising a reinforcing filler material.

16. A process for compatibilizing a relatively low molecular weight polyahl and a relatively high molecular weight polyol in proportions such that they are incompatible comprising adding thereto a compatibilizing agent containing (a) a metal salt of an acid, wherein the metal is selected from elements of the Periodic Table of the Elements having Atomic Numbers 3-5, 11-14, 19-34, 37-52, 55-57, and 72-84, and (b) a compound containing at least one amine group, in an amount sufficient to compatibilize the relatively low molecular weight polyahl and the relatively high molecular weight polyol.

17. The process of claim 16, wherein the relatively high molecular weight polyahl has an average molecular weight of at least about 1,000.

18. The process of claim 16 wherein the relatively high molecular weight polyahl is an amine-terminated compound.

19. The process of claim 18 wherein the amine-containing compound is an aliphatic or aromatic tertiary amine.

20. The process of claim 16, /wherein the relatively low molecular weight polyol has an average molecular weight of less than or equal to about 1,000.

21. The process of claim 20 wherein the relatively low molecular weight polyol has an average molecular weight of less than about 250.

22. The process of claim 16 wherein the relatively low molecular weight polyol is ethylene glycol, propylene glycol, trimethylol propane, 1,4-butane diol, diethylene glycol, dipropylene glycol, bisphenol, hydroquinone, catechol, resorcinol, triethylene glycol, tetraethylene glycol, dicyclopentadienediethanol, glyerine, catechol, resorcinol, diethylene triamine, or a mixture thereof.

23. The process of claim 22 wherein the relatively low molecular weight polyol is ethylene glycol.

24. The composition of claim 16 wherein the metal salt of an acid is zinc laurate, zinc stearate, zinc oleate, zinc palmitate, calcium laurate, calcium oleate, calcium palmitate, calcium stearate, magnesium laurate, magnesium stearate, magnesium oleate, magnesium palmitate, nickel laurate, copper stearate, copper oleate, copper laurate, copper palmitate, zinc stearoyl sarcosinate, zinc oleoyl sarcosinate, zinc palmitoyl sarcosinate, zinc lauroyl sarcosinate, calcium stearoyl sarcosinate, calcium oleoyl sarcosinate, calcium palmitoyl sarcosinate, calcium lauroyl sarcosinate, magnesium stearoyl sarcosinate, magnesium oleoyl sarcosinate, magnesium palmitoyl sarcosinate, magnesium lauroyl sarcosinate, nickel stearoyl sarcosinate, nickel oleoyl sarcosinate, nickel palmitoyl sarcosinate, nickel lauroyl sarcosinate, copper stearoyl sarcosinate, copper oleoyl sarcosinate, copper palmitoyl sarcosinate, copper lauroyl sarcosinate, zinc myristate, calcium myristate, magnesium myristate, nickel myristate, copper myristate, or mixtures thereof.

25. The process of claim 24 wherein the metal salt of an acid is zinc laurate, zinc stearate, zinc palmitate, zinc oleate, zinc myristate or a mixture thereof.

26. The process of claim 16 further comprising water.

27. A compatibilized composition comprising a relatively high molecular weight polyahl, a relatively low molecular weight polyol, in proportions such that the relatively high molecular weight polyahl and the relatively low molecular weight polyol are incompatible, and a compatibilizing agent containing a metal salt of an acid, wherein the metal is selected from elements of the Periodic Table of the Elements having Atomic Numbers 3-5, 11-14, 19-34, 37-52, 55-57, and 72-84, and a compound containing at least one amine group, said compatibilizing agent being present in an amount sufficient to compatibilize the relatively high molecular weight polyahl and the relatively low molecular weight polyol.

28. A composition for preparing a molded foamed polymeric article comprising (1) a relatively high molecular weight polyahl and, as a blowing agent, water, in proportions such that the relatively high molecular weight polyahl and the water are incompatible, (2) a polyisocyanate, and (3) a compatibilizing agent containing (a) a metal salt of an acid, wherein the metal is selected from elements of the Periodic Table of the Elements having Atomic Numbers 3-5, 11-14, 19-34, 37-52, 55-57, and 72-84, and (b) a compound containing at least one amine group, wherein the compatibilizing agent is present in an amount sufficient to compatibilize the relatively high molecular weight polyahl and the water.

29. A process for compatibilizing a relatively high molecular weight polyahl and water, in proportions such that the relatively high molecular weight polyahl and the water are incompatible, comprising admixing therewith a compatibilizing agent containing (a) a metal salt of an acid, wherein the metal is selected from elements of the Periodic Table of the Elements having Atomic Numbers 3-5, 11-14, 19-34, 37-52, 55-57, and 72-84, and (b) a compound containing at least one amine group, such that the compatibilizing agent is present in an amount sufficient to compatibilize the relatively high molecular weight polyahl and the water.

30. A compatibilized composition comprising a relatively high molecular weight polyahl and water, in proportions such that the relatively high molecular weight polyahl and the water are incompatible, and a compatibilizing agent containing a metal salt of an acid, wherein the metal is selected from elements of the Periodic Table of the Elements having Atomic Numbers 3-5, 11-14, 19-34, 37-52, 55-57, and 72-84, and a compound containing at least one amine group, said compatibilizing agent being present in an amount sufficient to compatibilize the relatively high molecular weight polyahl and the water.

* * * * *